United States Patent
Stewart et al.

(10) Patent No.: US 12,222,487 B2
(45) Date of Patent: Feb. 11, 2025

(54) HOLDING A SUBSTRATE WITHIN A SECONDARY DEVICE

(71) Applicant: RareCyte, Inc., Seattle, WA (US)

(72) Inventors: David Stewart, Seattle, WA (US); Steve Quarre, Woodinville, WA (US)

(73) Assignee: RareCyte, Inc., Seattle, WA (US)

( * ) Notice: Subject to any disclaimer, the term of this patent is extended or adjusted under 35 U.S.C. 154(b) by 614 days.

(21) Appl. No.: 16/805,120

(22) Filed: Feb. 28, 2020

(65) Prior Publication Data

US 2020/0278528 A1   Sep. 3, 2020

Related U.S. Application Data

(60) Provisional application No. 62/812,695, filed on Mar. 1, 2019.

(51) Int. Cl.
G02B 21/26 (2006.01)
G02B 21/24 (2006.01)

(52) U.S. Cl.
CPC .......... *G02B 21/26* (2013.01); *G02B 21/24* (2013.01)

(58) Field of Classification Search
CPC .......... G02B 7/00; G02B 7/001; G02B 7/003; G02B 7/005; G02B 21/00; G02B 21/24; G02B 21/26
USPC .......... 359/391–395, 896, 368–398
See application file for complete search history.

(56) References Cited

U.S. PATENT DOCUMENTS

| | | | |
|---|---|---|---|
| 4,012,112 A | 3/1977 | Masterson | |
| 4,063,083 A | 12/1977 | Cathey et al. | |
| 5,659,421 A | 8/1997 | Rahmel et al. | |
| 5,691,841 A | 11/1997 | Ohsaki et al. | |
| 5,779,203 A | 7/1998 | Edlinger | |
| 6,395,554 B1 | 5/2002 | Regan et al. | |
| 7,140,738 B2 | 11/2006 | Guiney et al. | |
| 7,300,163 B2 | 11/2007 | Scampini | |
| 7,403,330 B2 * | 7/2008 | Henderson | B01L 9/52 414/431 |
| 7,948,676 B2 | 5/2011 | Virag et al. | |
| 8,308,211 B2 * | 11/2012 | Chevassu | B23K 11/314 294/198 |
| 8,593,730 B2 | 11/2013 | Yamamoto et al. | |
| 8,625,930 B2 | 1/2014 | Tatke et al. | |
| 8,902,501 B2 | 12/2014 | Suzuki et al. | |
| 8,910,913 B2 * | 12/2014 | Hirose | A61B 1/00149 606/1 |
| 9,857,580 B2 * | 1/2018 | Quarre | G02B 21/34 |

(Continued)

FOREIGN PATENT DOCUMENTS

| | | |
|---|---|---|
| CN | 102313978 A | 1/2012 |
| CN | 102540441 A | 7/2012 |

(Continued)

*Primary Examiner* — Thong Q Nguyen
(74) *Attorney, Agent, or Firm* — Shay Glenn LLP

(57) ABSTRACT

Disclosed are apparatus and methods for securely holding a substrate in a repeatable and predictable manner regardless of substrate inconsistencies or deformities. In particular, described are apparatus and methods for consistently, repeatedly, predictably and securely holding a microscope slide on or within an imaging device. The apparatus may include a holder having securing blocks for securely holding a microscope slide that can be adjusted to account for warpage or deformations that may occur in the microscope slide.

20 Claims, 18 Drawing Sheets

(56) References Cited

U.S. PATENT DOCUMENTS

| | | |
|---|---|---|
| 10,802,260 B2 | 10/2020 | Quarre et al. |
| 10,890,748 B2 | 1/2021 | Quarre et al. |
| 11,237,377 B2 | 2/2022 | Quarre et al. |
| 11,422,352 B2 * | 8/2022 | Quarre .................. G02B 21/34 |
| 2004/0027659 A1 | 2/2004 | Messerschmidt et al. |
| 2005/0281661 A1 | 12/2005 | Kesil et al. |
| 2006/0033894 A1 | 2/2006 | Binnard |
| 2007/0147979 A1 | 6/2007 | Rice et al. |
| 2007/0290150 A1 | 12/2007 | Krupyshev et al. |
| 2008/0198450 A1 | 8/2008 | Guo et al. |
| 2008/0266560 A1 | 10/2008 | Kok |
| 2009/0095825 A1 | 4/2009 | Ahmadi et al. |
| 2009/0180090 A1 | 7/2009 | Hara |
| 2010/0040439 A1 | 2/2010 | Temple et al. |
| 2013/0259773 A1 | 10/2013 | Kubek |
| 2014/0240824 A1 | 8/2014 | Taylor et al. |
| 2014/0362436 A1 | 12/2014 | Forget |
| 2015/0138632 A1 | 5/2015 | Mikhailov |
| 2015/0357213 A1 | 12/2015 | Yokoyama et al. |
| 2016/0003065 A1 | 1/2016 | Stratton et al. |
| 2017/0315340 A1 | 11/2017 | Quarre et al. |
| 2018/0003939 A1 | 1/2018 | Quarre et al. |
| 2018/0128782 A1 | 5/2018 | Keeton et al. |
| 2020/0353467 A1 | 11/2020 | Cappii et al. |

FOREIGN PATENT DOCUMENTS

| | | |
|---|---|---|
| CN | 106415356 A | 5/2017 |
| CN | 108020596 A | 5/2018 |
| EP | 2299281 A2 | 3/2011 |
| EP | 3427829 A1 | 1/2019 |
| JP | 1993004113 U | 1/1993 |
| JP | 2013224850 A | 10/2013 |
| JP | 2018091834 A | 6/2018 |
| WO | WO9319207 | 9/1993 |
| WO | WO03/091137 A2 | 11/2003 |
| WO | WO2019036647 | 2/2015 |
| WO | WO2015/197742 A1 | 12/2015 |
| WO | WO2015183691 A1 | 12/2015 |

* cited by examiner

HOLDING A SUBSTRATE WITHIN A SECONDARY DEVICE

CROSS REFERENCE TO RELATED APPLICATIONS

This application claims the benefit of Provisional Application No. 62/812,695, filed Mar. 1, 2019.

INCORPORATION BY REFERENCE

All publications and patent applications mentioned in this specification are incorporated herein by reference in their entirety to the same extent as if each individual publication or patent application was specifically and individually indicated to be incorporated by reference.

FIELD

This disclosure relates generally to an apparatus for holding a substrate and, in particular, to an apparatus for securely holding a microscope slide on or within an imaging device.

BACKGROUND

When a substrate is not consistently secured in a repeatable, predictable manner regardless of substrate inconsistencies or deformities, the images may vary from substrate to substrate and it may be difficult to determine proper surface locations. As a result, practitioners, researchers, and those imaging samples on substrates continue to seek an apparatus for consistently, repeatably, and predictably securing substrates of varying inconsistencies or deformities.

SUMMARY OF THE DISCLOSURE

In a first aspect, a device is provided. The device comprises a frame comprising a first arm, a second arm, and at least two securing blocks; and a secure bar comprising at least two securing blocks, wherein the at least two securing blocks of the frame and the at least two securing blocks of the secure bar are on opposing sides of a cavity, wherein (1) one end of the secure bar is adjustable relative to the other end of the secure bar, or (2) one end of the second arm is adjustable relative to the other end of the second arm, wherein at least one of the securing blocks is at the adjustable end of the secure bar or at the adjustable end of the second arm, and wherein the adjustable end of the secure bar or the adjustable end of the second arm is adjustable along essentially a z-axis.

In some embodiments, the devices further comprises a flexure to permit adjustment of the adjustable end of the secure bar or the adjustable end of the second arm. The flexure can be at least one of a cut-out, a track, a groove, a notch, or one or more flexible materials. In some embodiments, the flexure comprises a clasp configured to adjust at least one of the position, angle, or location of the adjustable end of the secure bar or the adjustable end of the second arm. Each of the securing blocks can comprise a stopper and a ramp. In some embodiments, the secure bar is moveable relative to the frame. The secure bar can be connected to the first arm of the frame with at least one bearing, the bearing configured to permit the secure bar to move relative to the frame. The device can comprise a mount, wherein the mount connects the device to a secondary device. In some embodiments, the secondary device is a scanner, an imaging microscope, or a fluorescence microscope. The device can comprise a slider adjoined to the secure bar and a connector adjoined to the mount, wherein a portion of the slider fits within a track of the connector. In some embodiments, the device comprises a motor to move the secure bar relative to the frame. The first arm can comprise a platform configured to support a substrate. In some embodiments, the second arm comprises a pedestal configured to support a substrate.

In another aspect, a device is provided. The devices comprises a frame comprising a first arm and a second arm and at least two securing blocks; a secure bar comprising at least two securing blocks; and a flexure positioned between the at least two securing blocks of the first arm or between the at least two securing blocks of the secure bar, wherein the secure bar is movable relative to the frame, and wherein the at least two securing blocks of the frame and the at least two securing blocks of the secure bar are on opposing sides of a cavity.

In some embodiments, the flexure is positioned between the at least two securing blocks of the secure bar. The flexure can be configured to adjust at least one of the position, angle, or location of at least one of the at least two securing blocks of the secure bar or at least one of the at least two securing blocks of the first arm. In some embodiments, the flexure is configured to adjust at least one of the position, angle, or location of one of the at least two securing blocks of the secure bar independently of the other one of the at least two securing blocks of the secure bar. The flexure can be configured to adjust at least one of the position, angle, or location of one of the at least two securing blocks of the secure bar independently of the other one of the at least two securing blocks of the secure bar and independently of the at least two securing blocks of the frame. The flexure can comprise a clasp. In some embodiments, the flexure is at least one of one or more flexible materials, a cut-out, a track, a groove, or a notch. The secure bar can be movable to an open position to permit the insertion of the substrate, and movable to a closed position to permit the holding of the substrate.

DETAILED DESCRIPTION

This disclosure is directed to an apparatus for securely holding a substrate, such as a microscope slide. Suitable devices, systems, and/or methods for holding a substrate may include those described in one or more of the following U.S. patents and published applications, each of which is hereby incorporated by reference in its entirety: U.S. Pat. No. 9,857,580; 2017/0315340; 2017/0363850; 2017/0322407; 2017/0261735; 2018/0003939; 2018/0003940.

Securing Block

Figure 1A:
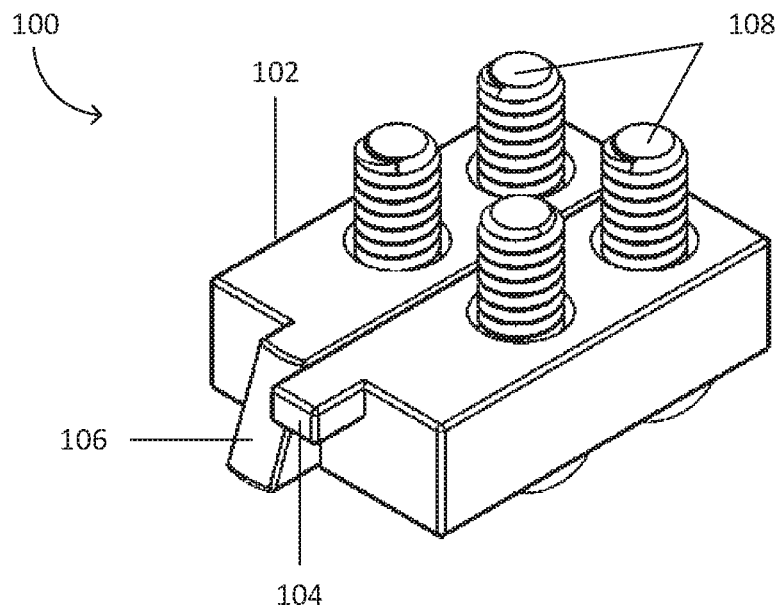
FIGS. 1A-1B show an example securing block.
Figure 1B:
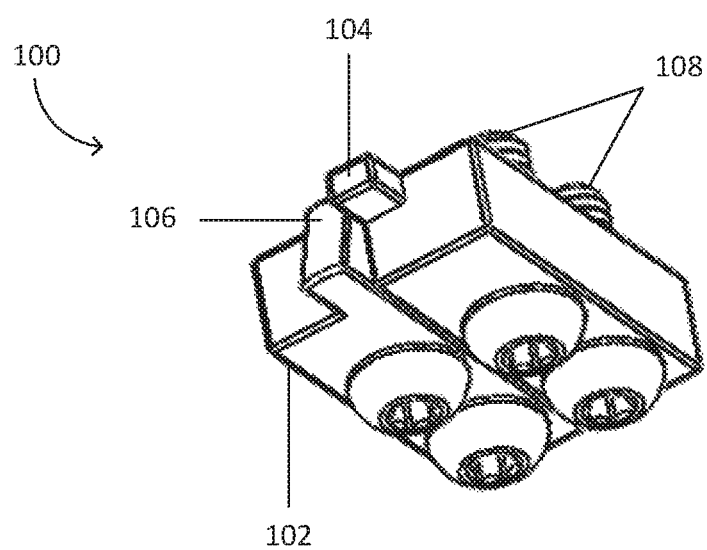
Figure 2A:
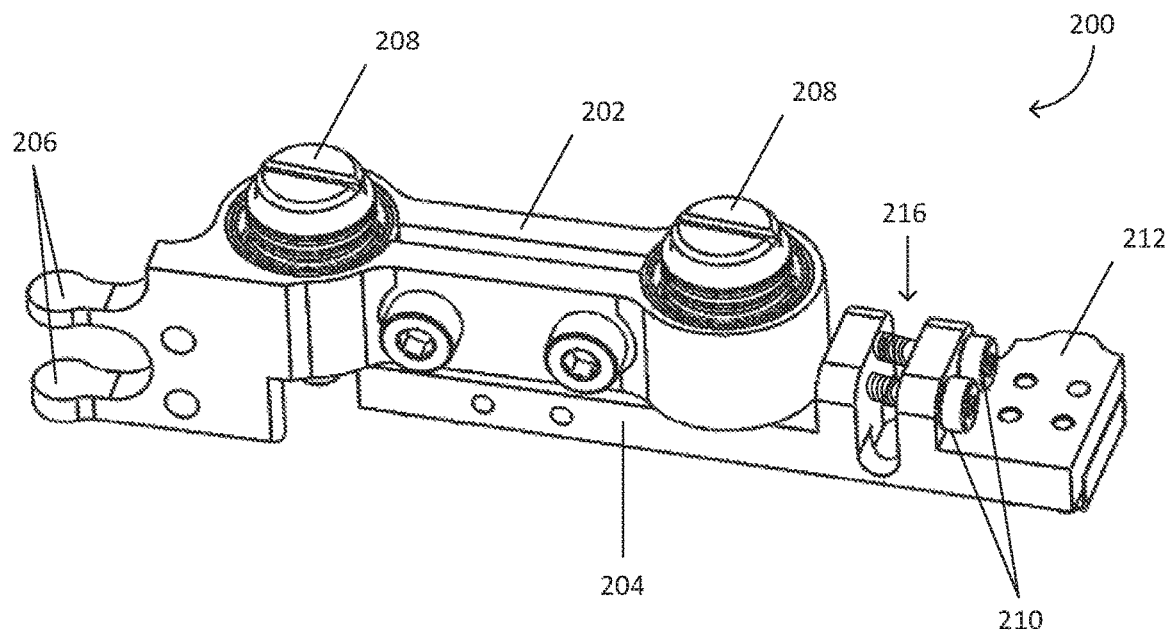
FIGS. 2A-2D show an example secure bar.
Figure 2B:
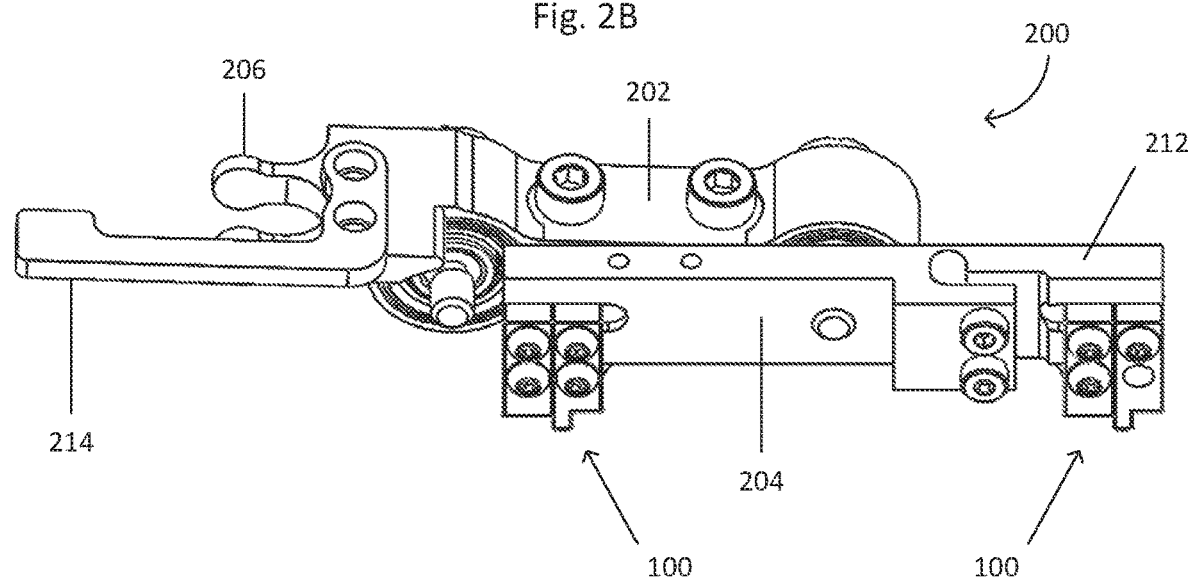
Figure 2C:
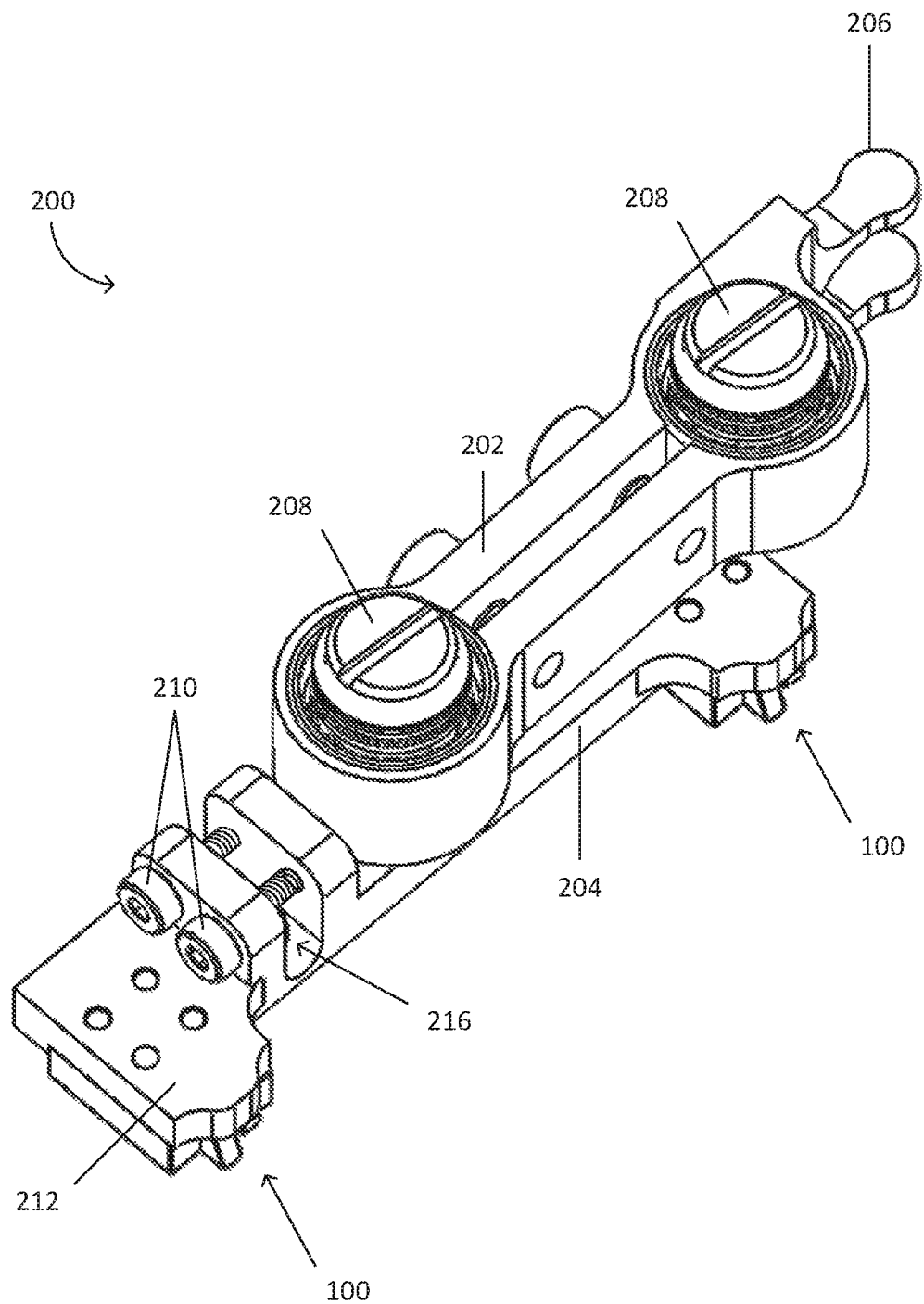
Figure 2D:
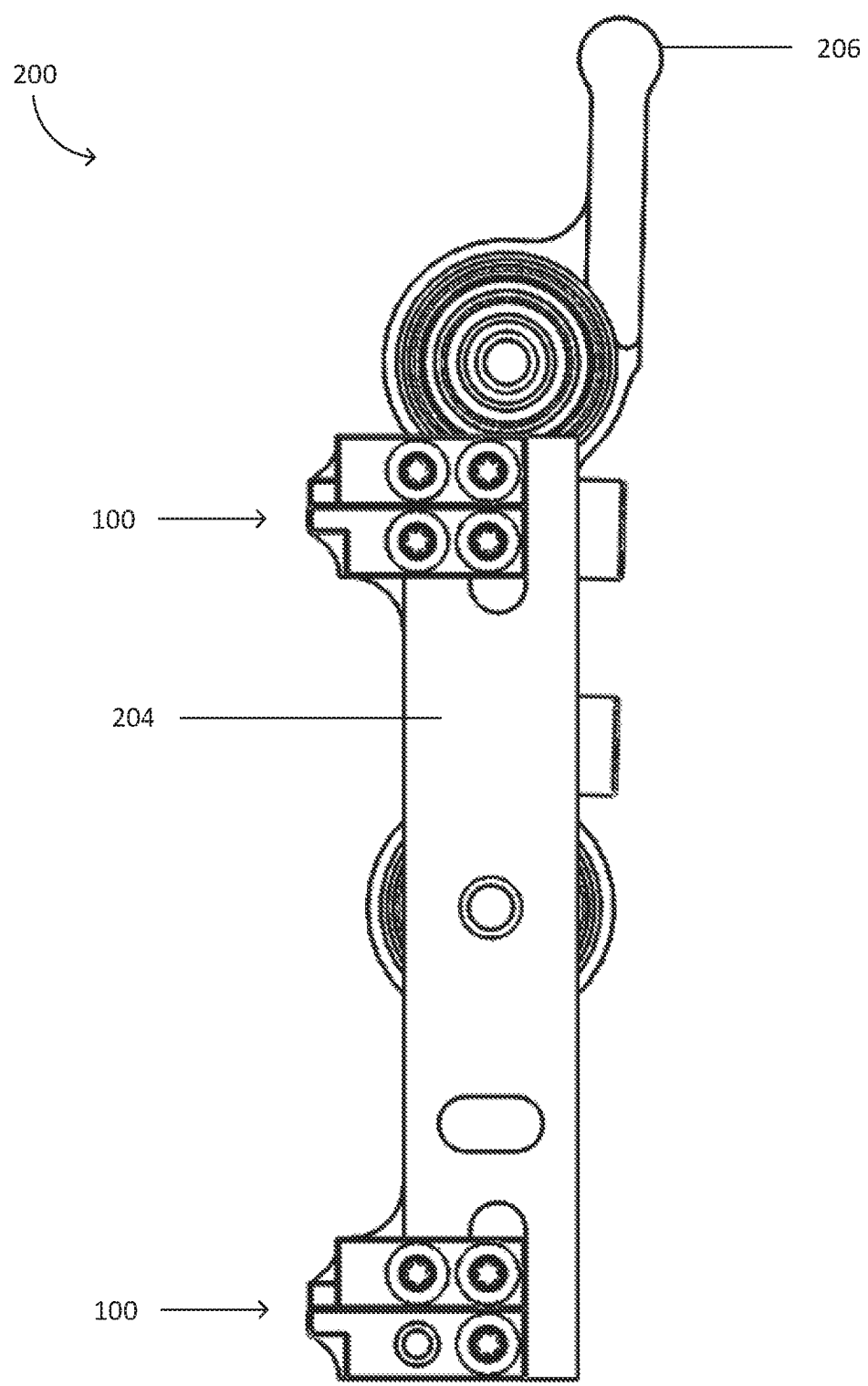

FIGS. 1A-1B show a securing block 100. The securing block 100 includes a main body 102 with a stopper 104 and a ramp 106, both of which extend from the same side of the main body 102. The securing block 100 can be configured and/or oriented to cause a substrate to travel vertically, downwardly, horizontally, orthogonally, or combinations thereof. Therefore, the securing block 100 can be inverted, rotated, or adjusted in any desired manner to cause the substrate to travel in at least one desired direction. In one embodiment, the securing block 100 provides a controlled references surface for a substrate during imaging, processing, holding, or the like. In one embodiment, the securing block 100 provides a flat substrate surface during imaging, processing, holding, or the like when a substrate has a non-flat (e.g., curved, twisted, warped, or the like) surface.

In one embodiment, the main body 102 can be a single piece. In one embodiment, the main body 102 can be multiple pieces, including at least two pieces. When the main body 102 is at least two pieces, a first piece includes the stopper 104 and a second piece includes the ramp 106.

In one embodiment, the main body 102 includes at least one hole (not shown) to accept at least one fastener 108 for attachment to a frame or a secure bar. In one embodiment, the securing block 100 includes at least one height adjuster (not shown), such as a shim, to adjust the height of the securing block 100 relative to the frame or the secure bar.

In one embodiment, the stopper 104 can be any appropriate shape, including, but not limited to, triangular, hemispherical, parabolic, trapezoidal, rectangular, cubical, or the like. In one embodiment, the ramp 106 can be any appropriate shape, including, but not limited to, triangular, hemispherical, parabolic, trapezoidal, or the like.

Secure Bar

FIGS. 2A-2D show a secure bar 200. The secure bar 200 includes a bracket 202 and a strut 204. The strut 204 includes a proximal end including a first securing block 100 and a distal end 212 including a second securing block 100. In one embodiment, the bracket 202 and the strut 204 are a single piece. In one embodiment, the bracket 202 and the strut 204 are separate pieces. When the bracket 202 and the strut 204 are separate pieces, the bracket 202 and the strut 204 can be attached, adjoined, or adhered to each other by screws, dowels, rods, rivets, at least one dovetail joint, at least one tongue-and-groove joint, an adhesive, an epoxy, at least one magnet, or by any other appropriate manner in which to attach, adjoin, or adhere two or more pieces.

In one embodiment, the bracket 202 can include at least one bearing 208 to permit rotation of the bracket 202 relative to a substrate (not shown) or at least one other component, including, without limitation, the strut 204 or a frame (not shown). In one embodiment, the bracket 202 can include two or more bearings 208.

In one embodiment, the bracket 202 includes a projection 206 extending outwardly from the bracket 202. In one embodiment, the bracket 202 includes two projections 206 extending outwardly, in the same direction, from the bracket 202. In one embodiment, the bracket 202 includes a flange 214 extending outwardly from the bracket 202 in the same direction as the projection 206.

In one embodiment, the secure bar 200 can include at least one flexure 216, such as one or more flexible materials, a cut-out (e.g., a track, a groove, a notch, or the like), a material less stiff than the other material composing the strut 204, or the like. The at least one flexure 216 allows for movement of the securing block 100 via the proximal end or the distal end 212 of the secure bar 200 to move along a given axis (for example, the z-axis) relative to the other end of the secure bar 200. The at least one flexure 216 can extend at least partially through a top face of the strut 204, can extend at least partially through a bottom face of the strut 204, can extend at least partially through a side face of the strut 204, or can extend entirely across the strut 204. The segment including the at least one flexure 216 can also include a clasp 210 to set the position, angle, location, or the like along the given axis (for example, the z-axis) of the segment including the securing block 100 and the at least one flexure 216 once the desired position, angle, location, or the like has been determined. The clasp 210 can include, but is not limited to, screws, dowels, rods, and rivets. The clasp 210 can also be used to adjust position, angle, location, or the like of the segment including the at least one flexure 216. In one embodiment, the distal end 212 of the strut 204 can be adjusted (i.e., angle, position, location, or the like), such as by translating, flexing, bending, twisting, or moving, relative to, and/or independently of, the proximal end of the strut 204. The distal end 212 can also include at least one securing block 100. In one embodiment, the proximal end of the strut 204 can be adjusted (i.e., angle, position, location, or the like), such as by translating, flexing, bending, twisting, or moving, relative to, and/or independently of, the distal end 212 of the strut 204. The proximal end can also include at least one securing block 100.

Figure 3A:
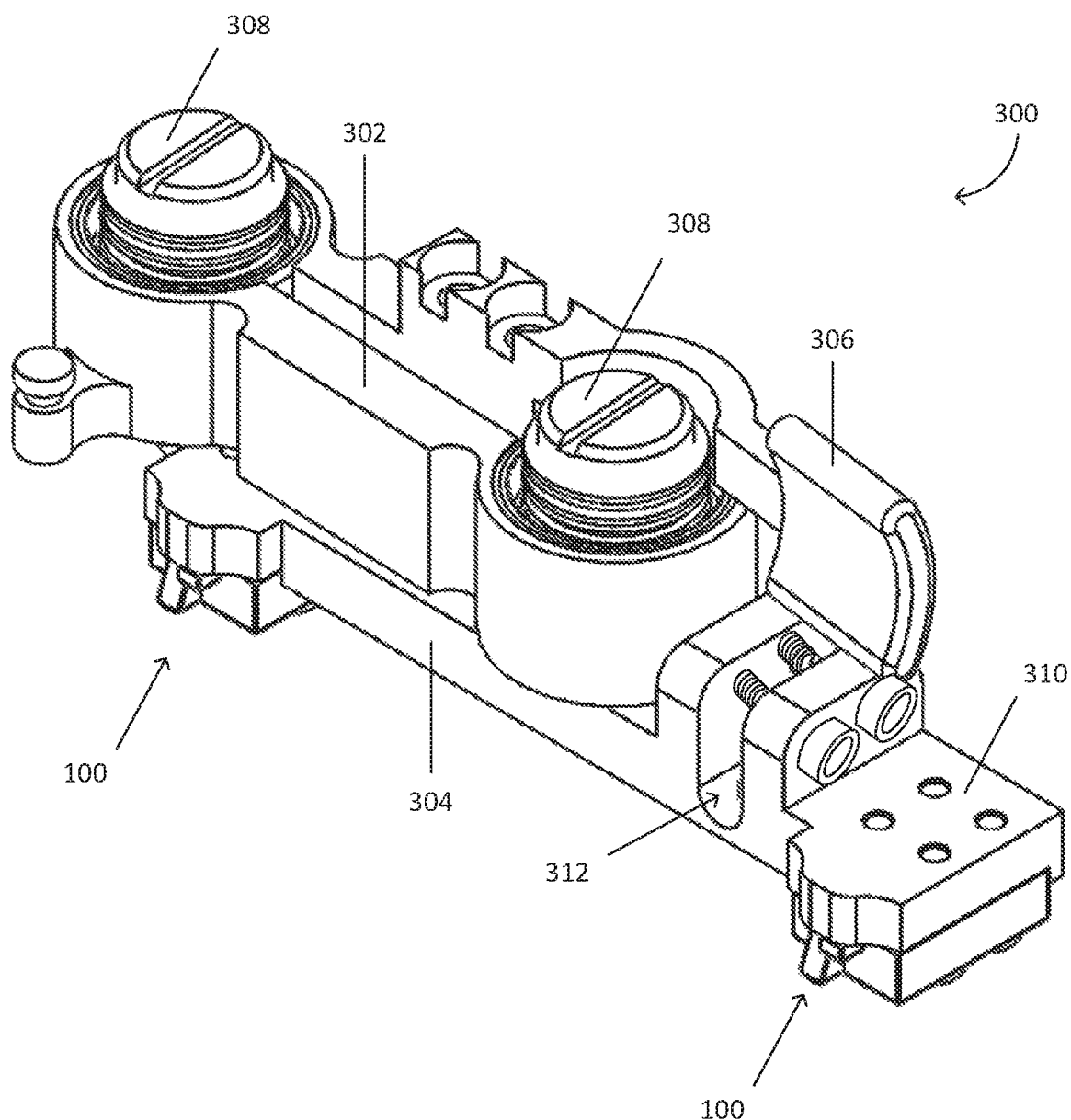
FIGS. 3A-3B show an example secure bar.
Figure 3B:
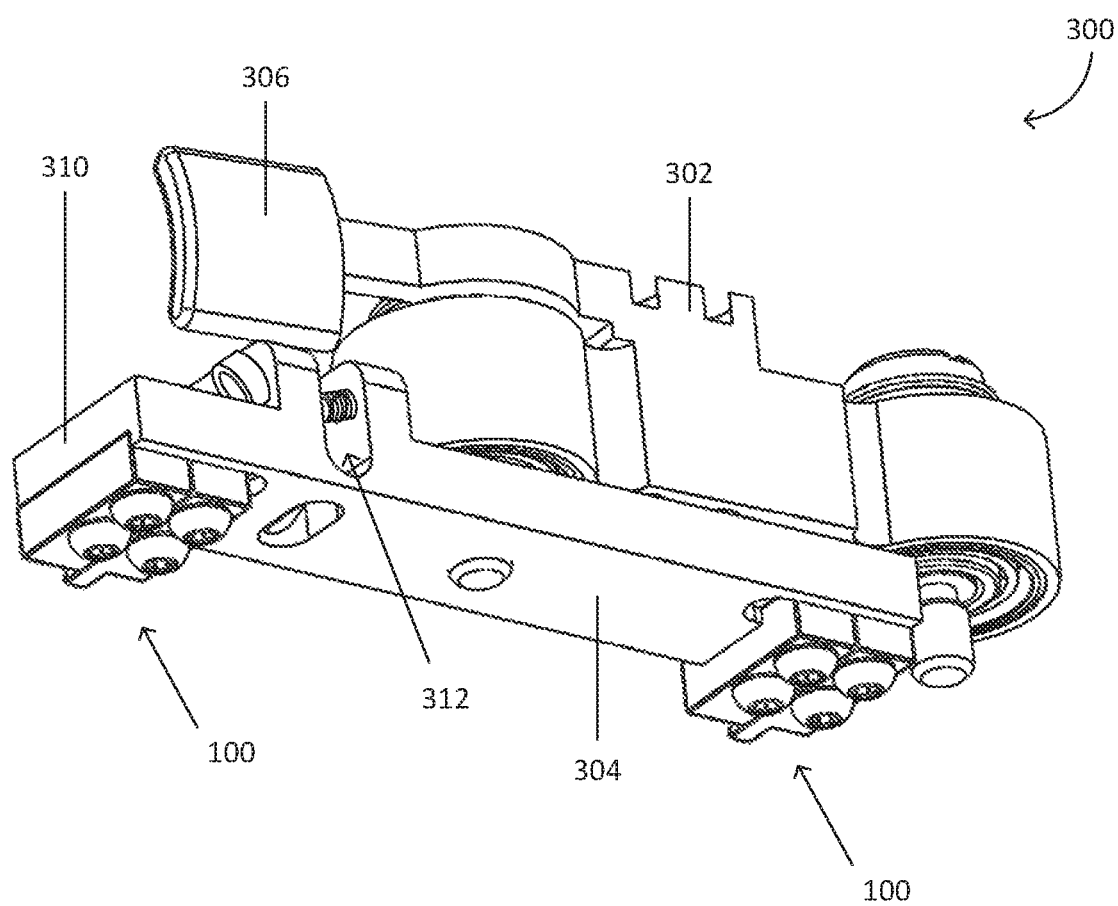

FIGS. 3A-3B show a secure bar 300. The secure bar 300 is similar to the secure bar 200, except that secure bar 300 includes a projection 306 at a distal end of a bracket 302. The secure bar 300 includes the bracket 302 and a strut 304. The strut 304 includes a proximal end including a first securing block 100 and a distal end 310 including a second securing block 100. In one embodiment, the bracket 302 and the strut 304 are a single piece. In one embodiment, the bracket 302 and the strut 304 are separate pieces. When the bracket 302 and the strut 304 are separate pieces, the bracket 302 and the strut 304 can be attached, adjoined, or adhered to each other by screws, dowels, rods, at least one dovetail joint, at least one tongue-and-groove joint, an adhesive, an epoxy, at least one magnet, or by any other appropriate manner in which to attach, adjoin, or adhere two or more pieces.

In one embodiment, the bracket 302 can include at least one bearing 308 to permit rotation of the bracket 302 relative to a substrate (not shown) or at least one other component, including, without limitation, the strut 304 or a frame (not shown).

In one embodiment, the bracket 302 includes a projection 306 extending outwardly from the bracket 302. In one embodiment, the bracket 302 includes two projections 306 extending outwardly, in the same direction, from the bracket 302.

In one embodiment, the secure bar 300 can include at least one flexure 312, such as one or more flexible materials, a cut-out (e.g., a track, a groove, a notch, or the like), a material less stiff than the other material composing the strut 304, or the like. The at least one flexure 312 allows for movement of the securing block 100 via the proximal end or the distal end 310 of the secure bar 300 to move along a given axis (for example, the z-axis) relative to the other end of the secure bar 300. The at least one flexure 312 can extend at least partially through a top face of the strut 304, can extend at least partially through a bottom face of the strut 304, can extend at least partially through a side face of the strut 304, or can extend entirely across the strut 304. The segment including the at least one flexure 312 can also include a clasp to set the position, angle, location, or the like along the given axis (for example, the z-axis) of the segment including the securing block 100 and the at least one flexure 312 once the desired position, angle, location, or the like has been determined. The clasp can include, but is not limited to, screws, dowels, rods, and rivets. The clasp can also be used to adjust position, angle, location, or the like of the segment including the at least one flexure 312. In one embodiment, the distal end 310 of the strut 304 can be adjusted (i.e., angle, position, location, or the like), such as by translating, flexing, bending, twisting, or moving, relative to, and/or independently of, the proximal end of the strut 304. The distal end 310 can also include at least one securing block 100. In one embodiment, the proximal end of the strut 304 can be adjusted (i.e., angle, position, location, or the like), such as by translating, flexing, bending, twisting, or moving, relative to, and/or independently of, the distal end 310 of the strut 304. The proximal end can also include at least one securing block 100.

Holder

Figure 4A:
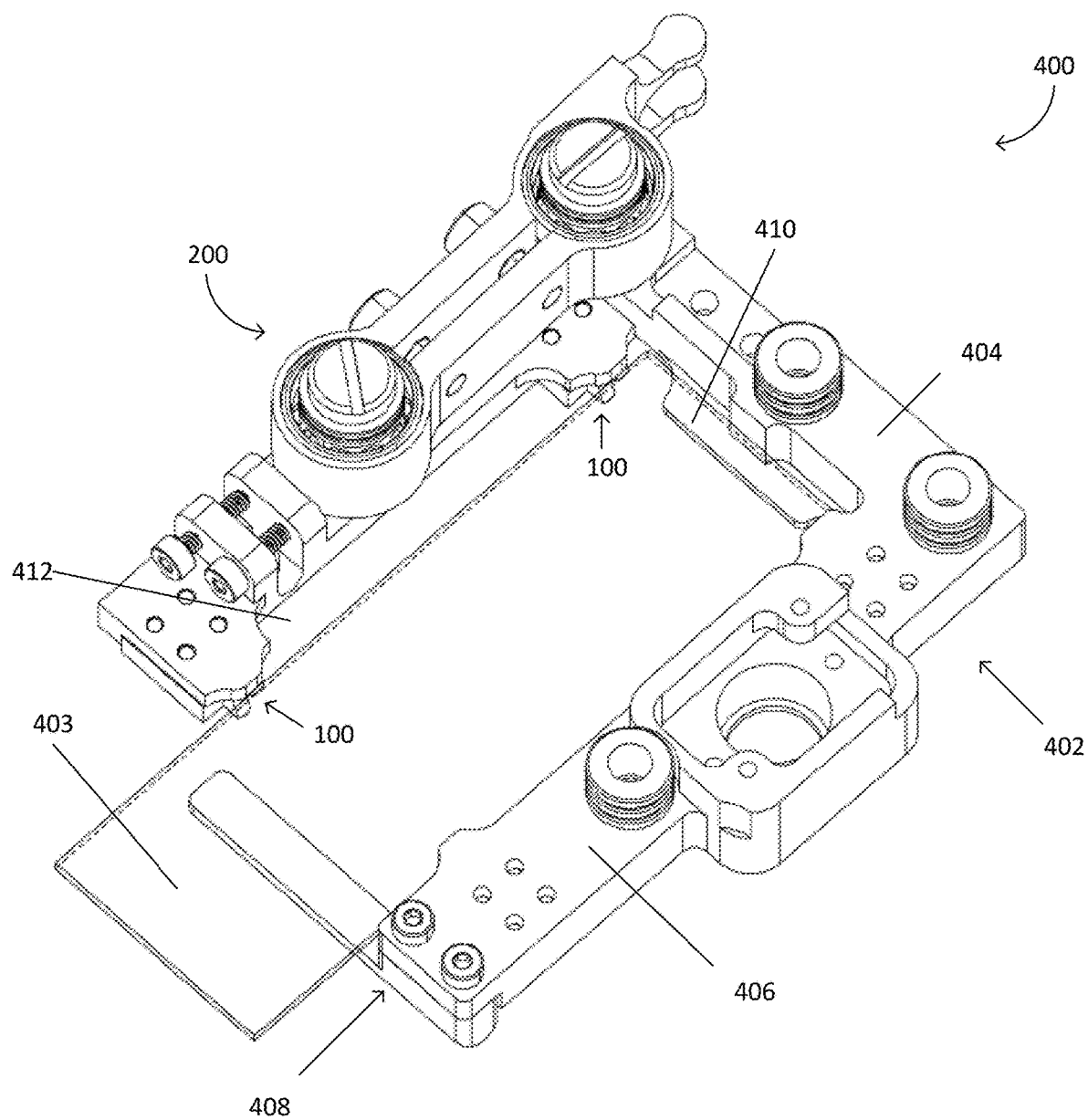
FIGS. 4A-4C show an example substrate holder.
Figure 4B:
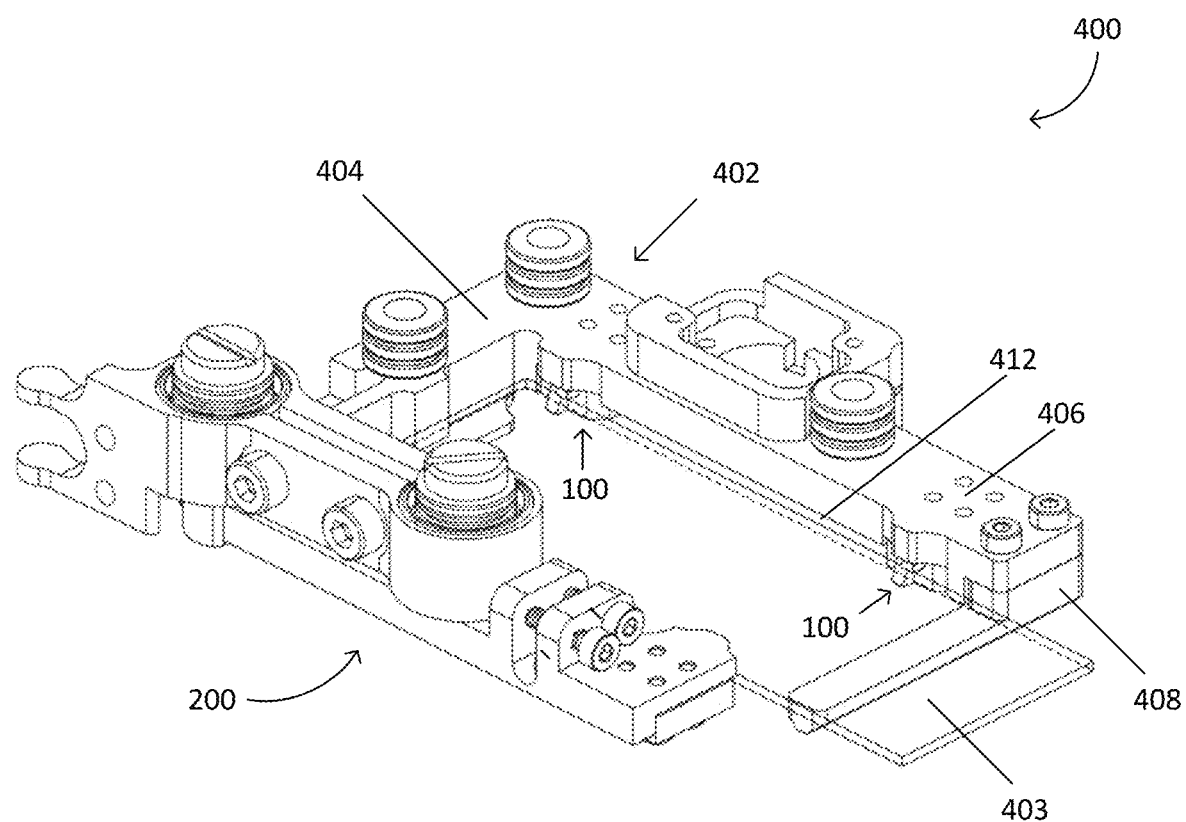
Figure 4C:
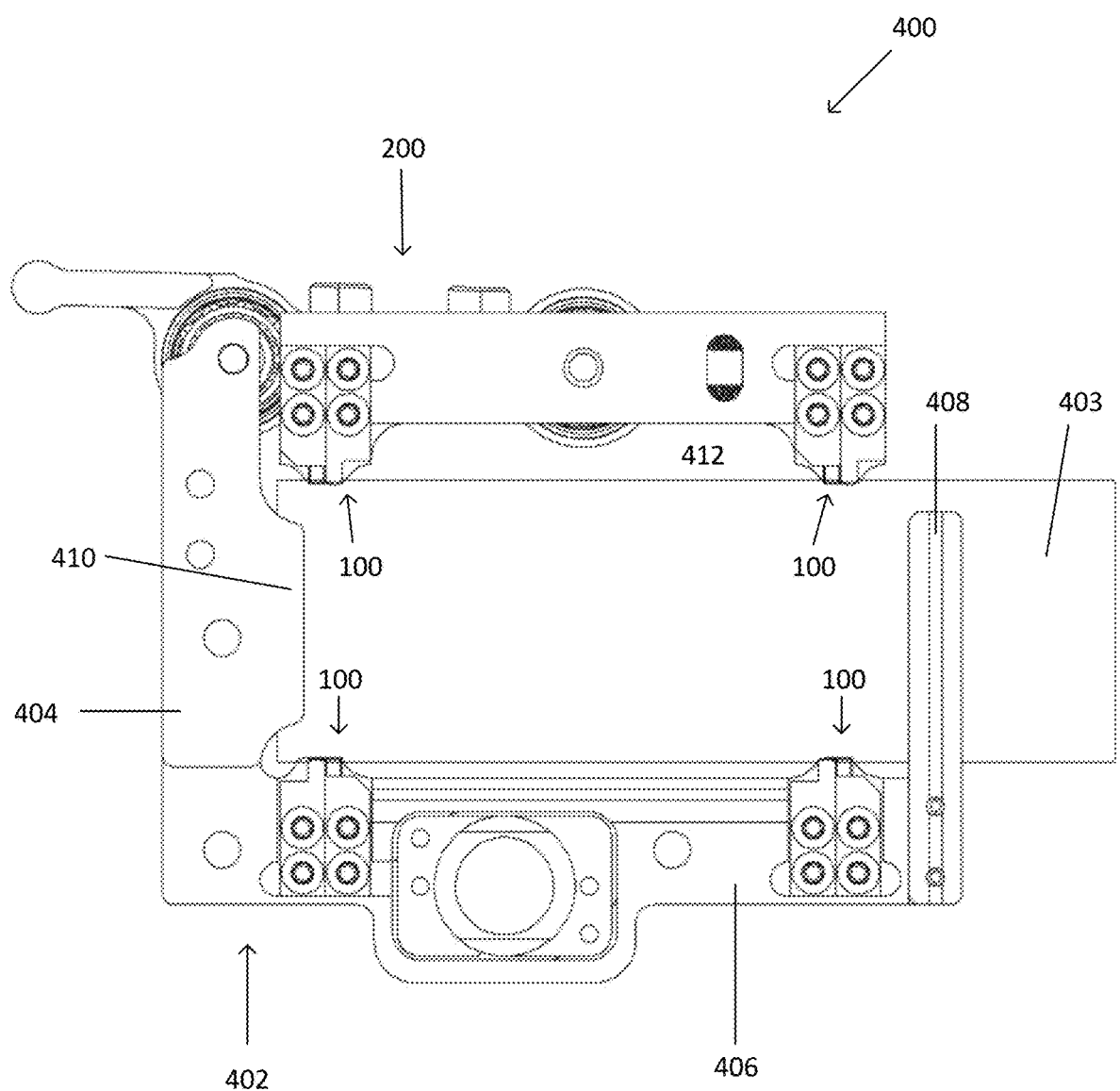

FIGS. 4A-4C show a holder 400. The holder 400 includes a frame 402 and the secure bar 200. Frame 402 includes a first arm 404 and a second arm 406. The secure bar 200 can move, rotate, or translate freely and independently of the frame 402, such as having an open position (i.e., to permit the insertion of a substrate) and a closed position (i.e., to permit the secure holding of the substrate). The holder 400 includes a cavity 412 which is formed by the secure bar 200 and the frame 402, and which is sized and shaped to fit and accept a substrate 403. The first and second arms 404, 406 are joined at proximal ends. In one embodiment, the first arm 404 is longer than the second arm 406. In one embodiment, the second arm 406 is longer than the first arm 404. In one embodiment, the first and second arms 404, 406 are equal in length. In one embodiment, the frame 402 is a single piece. In one embodiment, the frame 402 is at least two pieces, such that the first arm 404 is part of or fully forms a first piece and the second arm 406 is part of or fully forms a second piece.

It should be noted that the movement, rotation, or translation of the secure bar 200, 300 from the open position to closed position (and vice versa) causes the entirety of the secure bar 200, 300 to move, rotate, or translate. However, the movement, rotation, or translation of the secure bar 200, 300 is different than the movement or adjustment of the at least one securing block via the proximal or distal ends along a given axis. Therefore, adjustment of at least one securing block 100 along a given axis is such that at least one securing block 100 can be adjusted (i.e., angle, position, location, or the like) by translating, flexing, bending, twisting, or moving the segment of the secure bar 200, 300 or the frame 402, 502 on which the at least one securing block 100 is located relative to, and/or independently of, other segments of the secure bar 200, 300 or the frame 402, 502. In other words, for example, the entirety of the secure bar 200, 300 can have a first motion for opening and closing, and then a segment of the secure bar 200, 300 can have a second motion for adjusting the at least one securing block 100 located on or at that segment.

The secure bar 200 is proximal to the distal end of the first arm 404. In one embodiment, the first arm 404 is connected to the strut 204 of the secure bar 200. In one embodiment, the first arm 404 is connected to the bracket 202 of the secure bar 200. In one embodiment, the first arm 404 is connected to at least one bearing 208 of the secure bar 200.

In one embodiment, an inner surface of the first arm 404 includes a platform 410 at least partially located between the proximal and distal ends. The platform 410 can support the substrate 403.

The second arm 406 includes at least two securing blocks 100. In one embodiment, each of the securing blocks 100 of the second arm 406 are directly across the cavity 412 from the corresponding securing blocks 100 of the secure arm 200. In one embodiment, at least one of the securing blocks 100 is not directly across the cavity 412 from the corresponding securing block 100 of the secure bar 200. In one embodiment, the distal end of second arm 406 includes a pedestal 408 extending towards the secure bar 200. The pedestal 408 can support the substrate (not shown).

The secure bar 200 has an open position and a closed position. In one embodiment, the secure bar 200 of the holder 400 is moved from the open position to the closed position, and vice versa, by a motor (not shown, see FIGS. 6A-6D). The motor (not shown) is adjoined to or connected to the at least one projection 206 and/or the flange 214. In one embodiment, the motor (not shown) is adjoined to or connected to the at least one projection 206 and/or the flange 214 by a coupling (not shown). In one embodiment, the motor (not shown) is directly adjoined to or connected to the at least one projection 206 and/or the flange 214.

In one embodiment, at least one securing block 100 is adjustable along a given axis (for example, the z-axis), while the other securing blocks 100 are stationary, excluding adjusting the height relative to the frame 402 or the secure bar 200. In one embodiment, all of the securing blocks 100 are adjustable along a given axis (for example, the z-axis).

In one embodiment, at least one of the first or second arms 404, 406 of the frame 402 includes at least one flexure (not shown), such as one or more flexible materials, a cut-out (e.g., a track, a groove, a notch, or the like), a material less stiff than the other material composing the frame, or the like. For example, the second arm can include the at least one flexure (not shown) to allow for movement of the securing block 100 via the proximal end or the distal end of the second arm 406 (depending on the location of the at least one flexure within the second arm 406, for example) to move along a given axis (for example, the z-axis) relative to the other end of the second arm 406. The at least one flexure (not shown) can extend at least partially through a top face of the second arm 406, can extend at least partially through a bottom face of the second arm 406, can extend at least partially through a side face of the second arm 406, or can extend entirely across the second arm 406. The segment including the at least one flexure (not shown) can also include a clasp (not shown) to set the position, angle, location, or the like along the given axis (for example, the z-axis) of the segment including the securing block 100 and the at least one flexure (not shown) once the desired position, angle, location, or the like has been determined. The clasp (not shown) can include, but is not limited to, screws, dowels, rods, and rivets. The clasp (not shown) can also be used to adjust position, angle, location, or the like of the segment including the at least one flexure (not shown). In one embodiment, the distal end of the second arm 406 can be adjusted (i.e., angle, position, location, or the like), such as by translating, flexing, bending, twisting, or moving, relative to, and/or independently of, the proximal end of the second arm 406. The distal end can also include at least one securing block 100. In one embodiment, the proximal end of the second arm 406 can be adjusted (i.e., angle, position, location, or the like), such as by translating, flexing, bending-ing, twisting, or moving, relative to, and/or independently of, the distal end of the second arm 406. The proximal end can also include at least one securing block 100.

In one embodiment, all of the securing blocks 100 have the same configuration and design. In one embodiment, at least one of the securing blocks 100 has a configuration and/or design different than the other securing blocks 100.

Figure 5A:
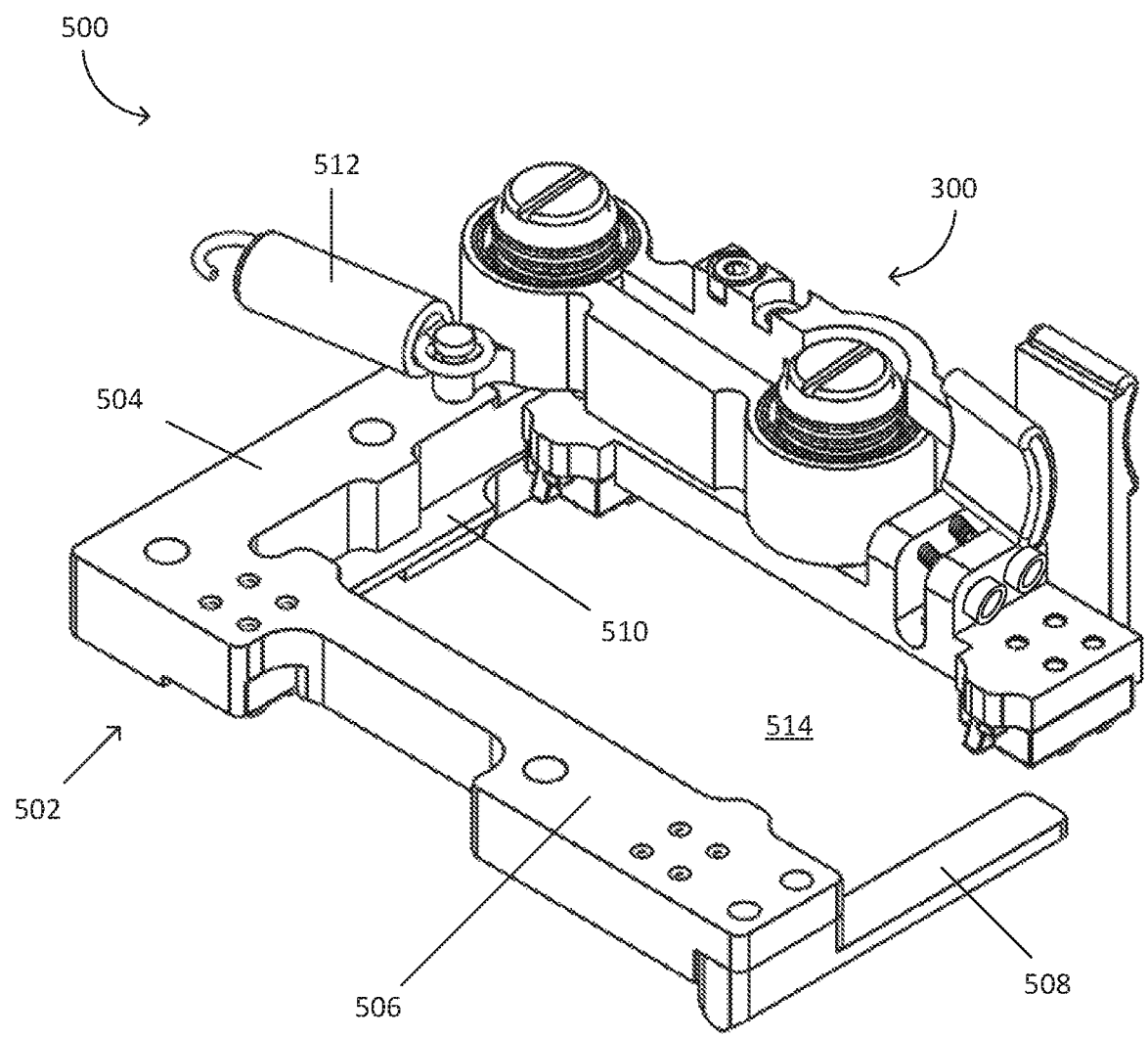
FIGS. 5A-5C show an example substrate holder.
Figure 5B:
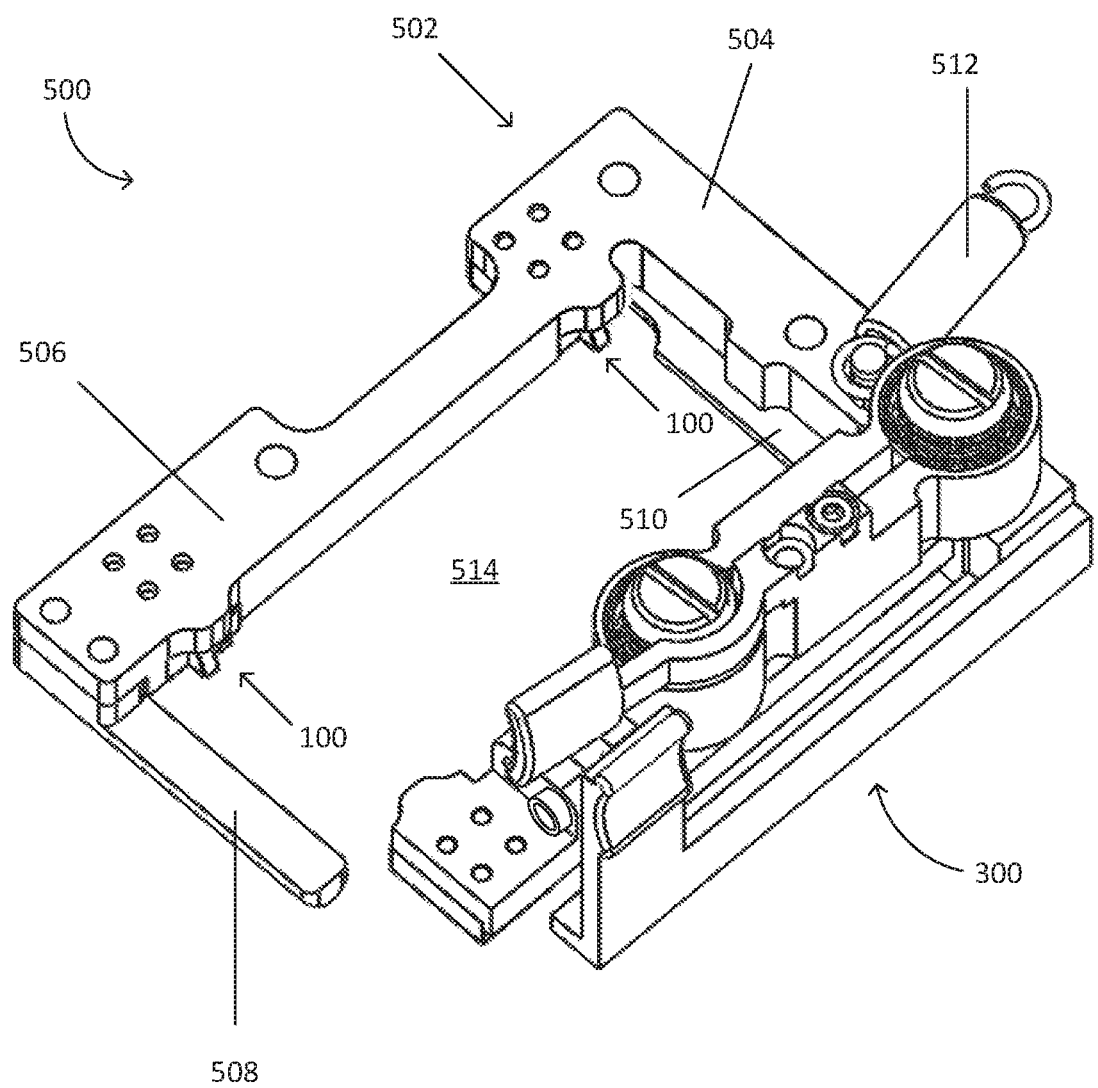
Figure 5C:
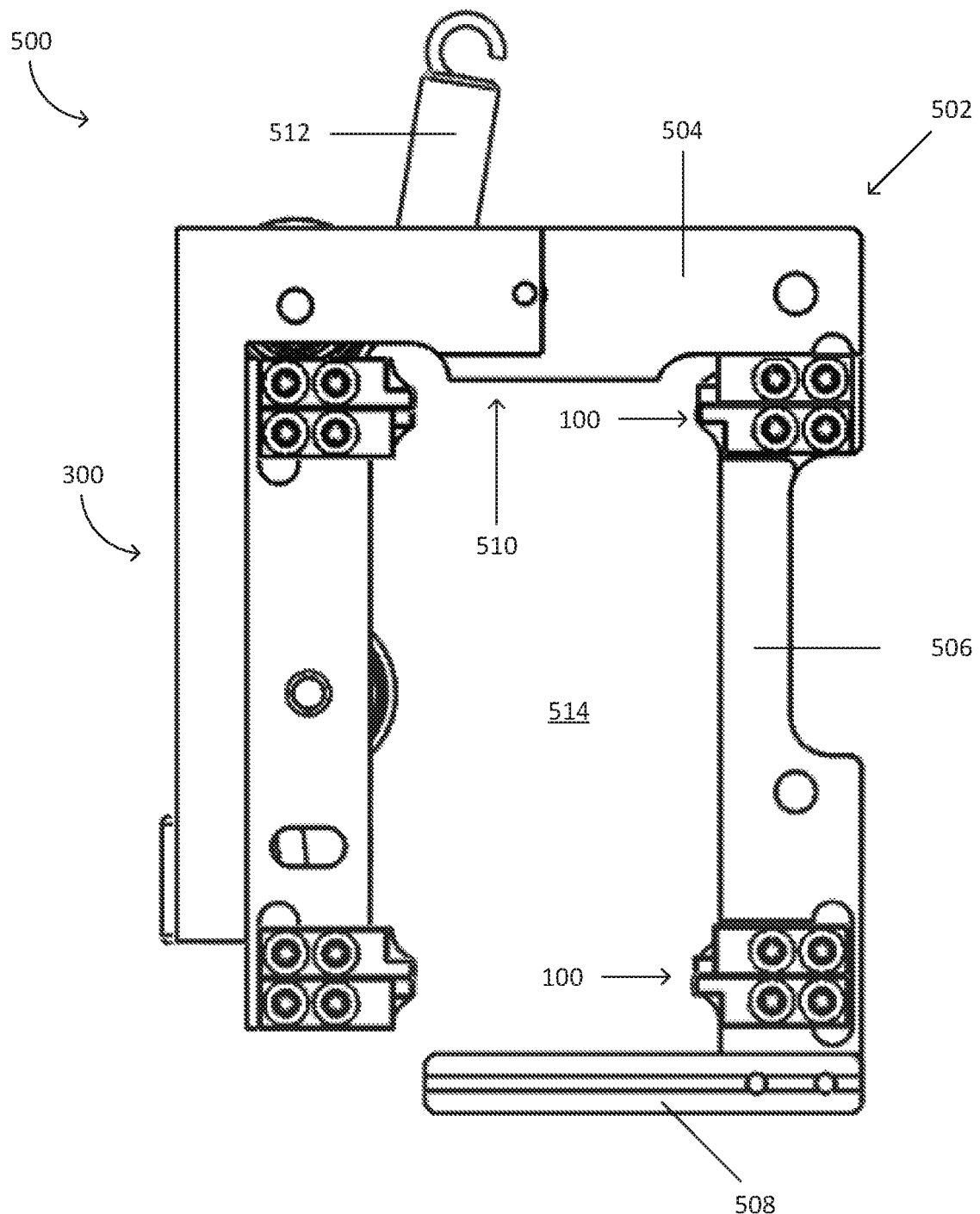
Figure 6A:
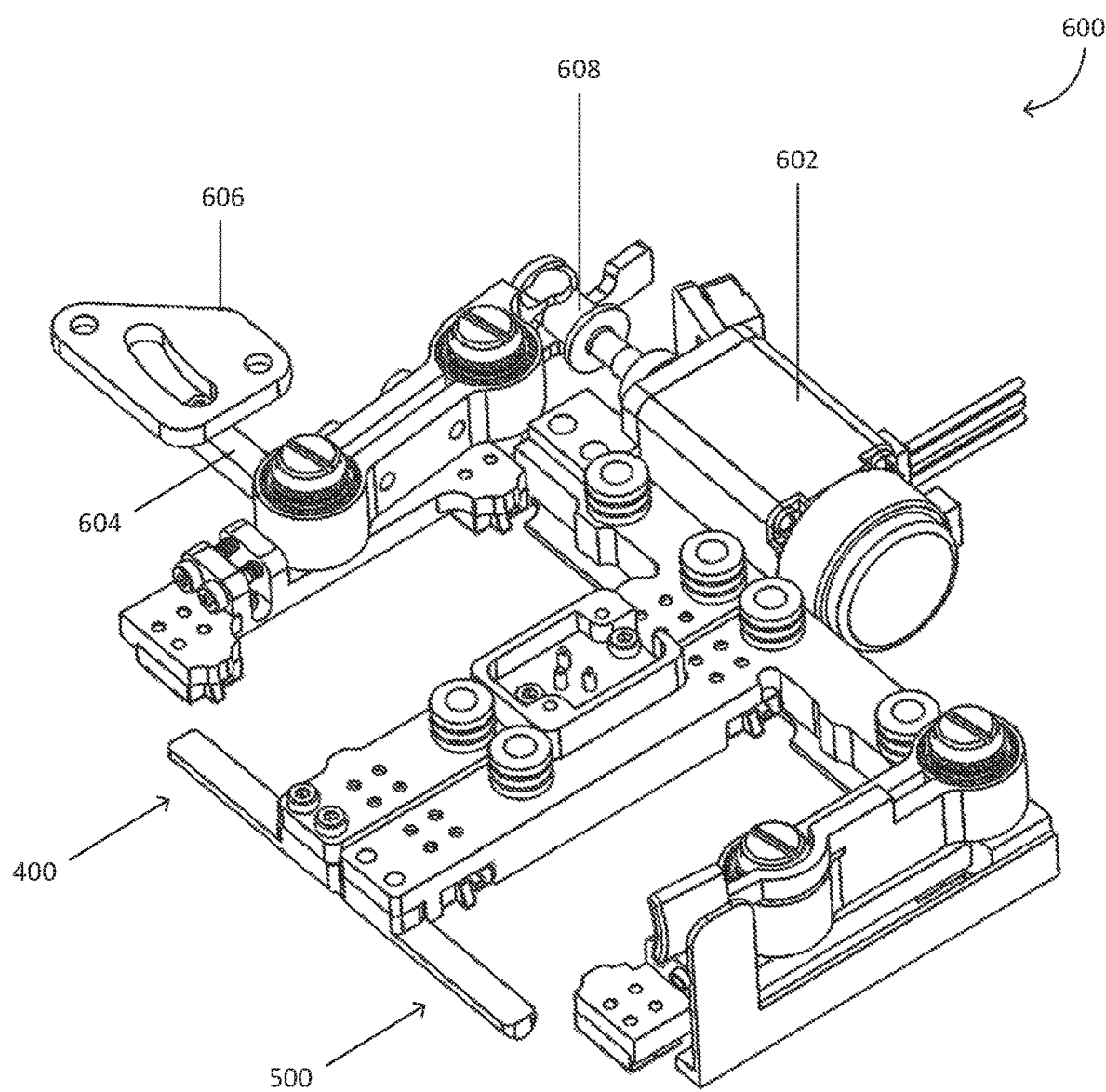
FIGS. 6A-6D show an example substrate holder.
Figure 6B:
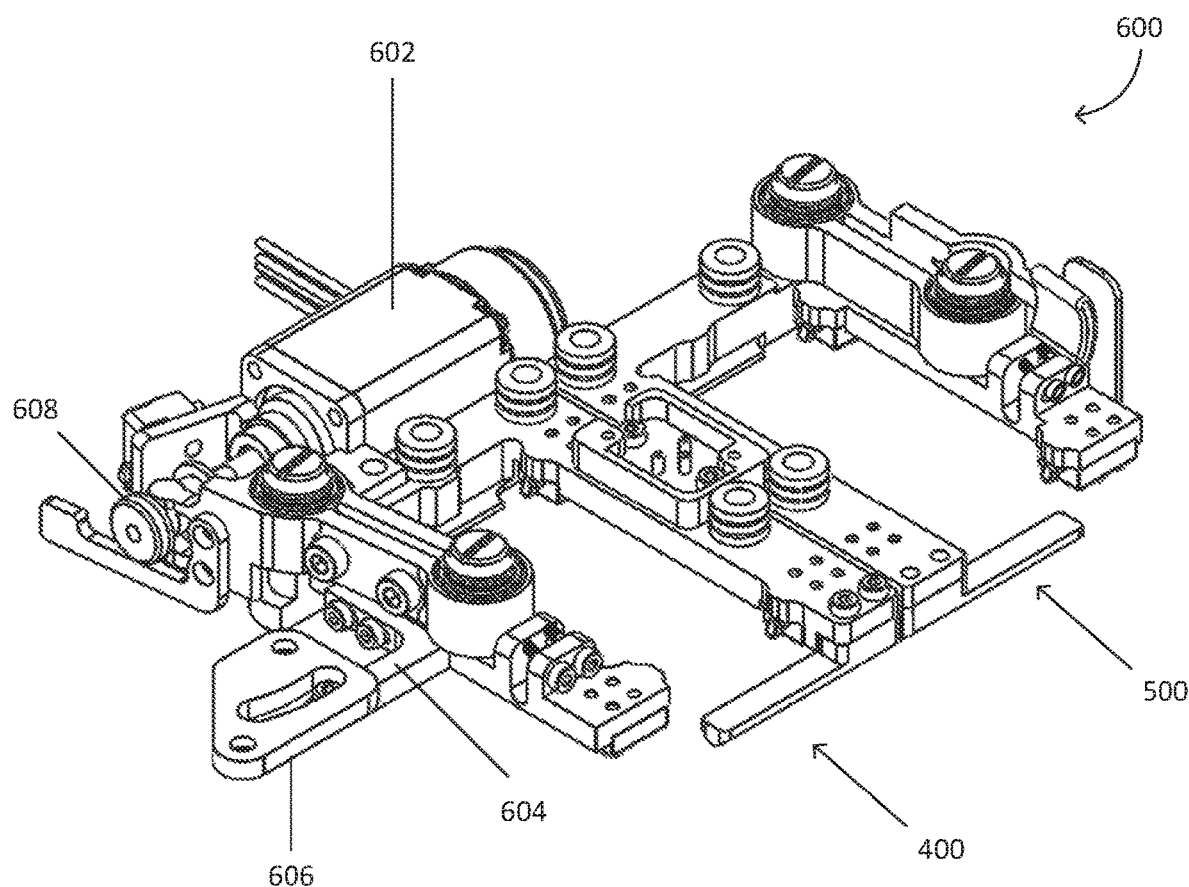
Figure 6C:
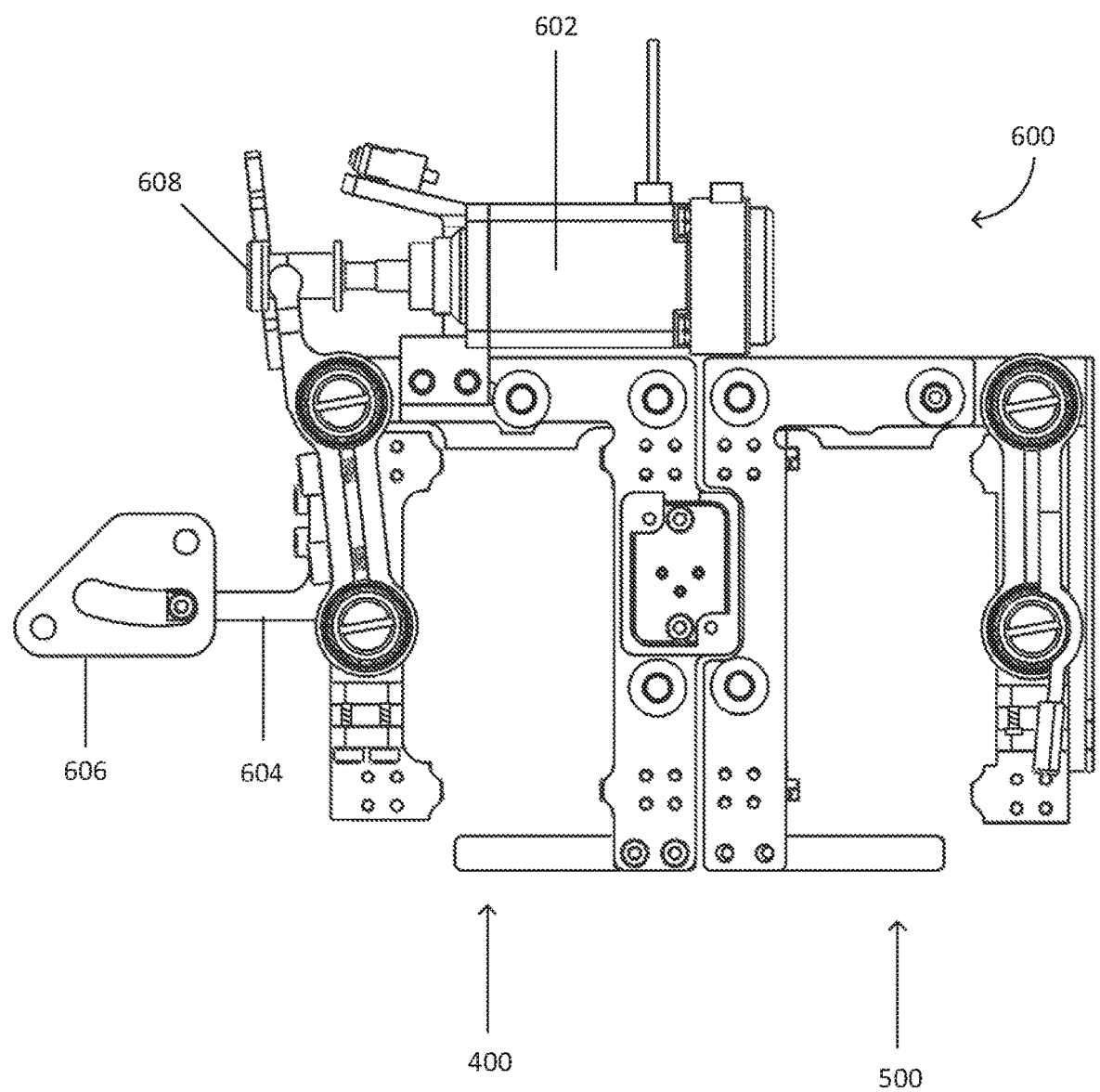
Figure 6D:
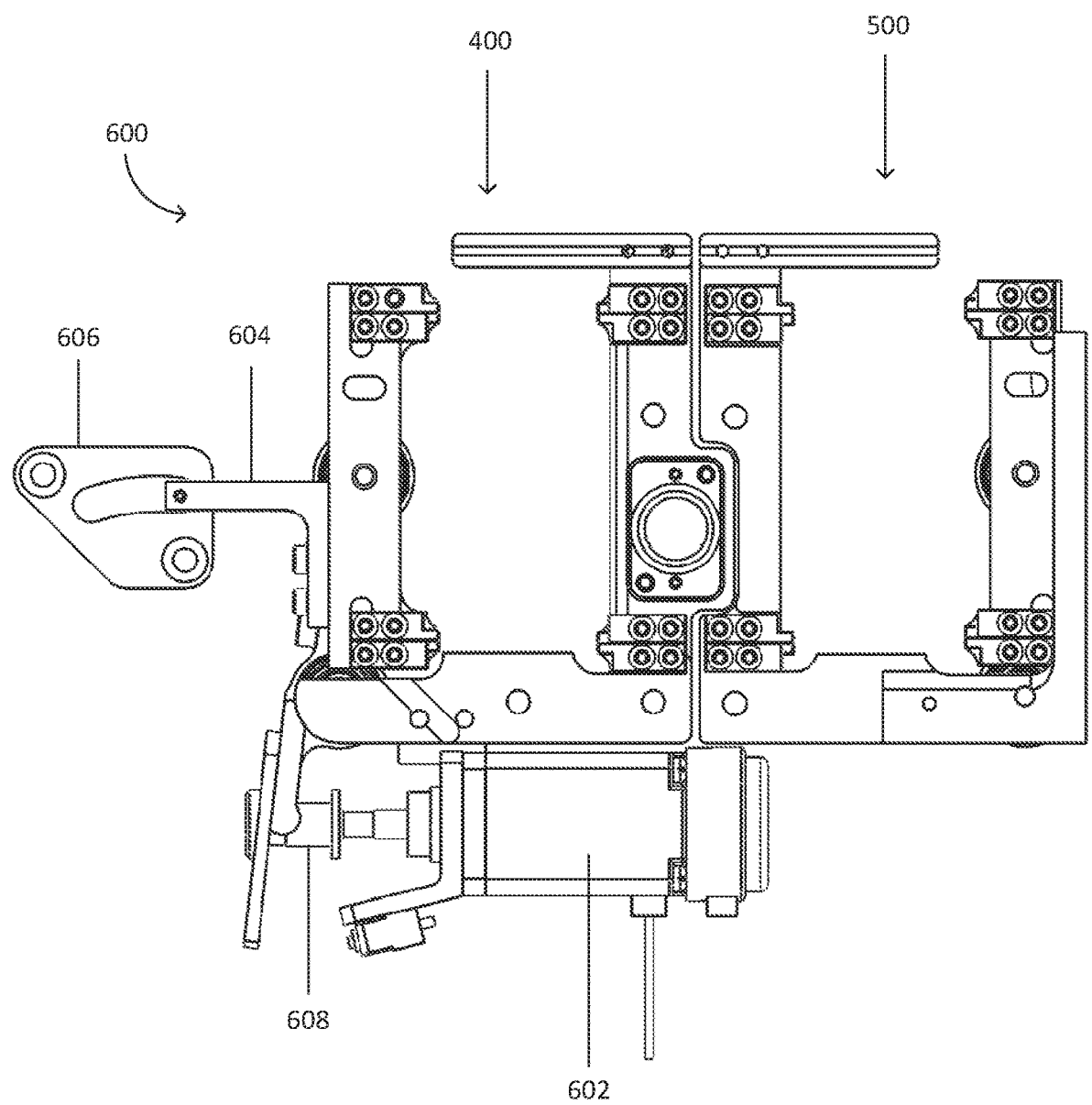

FIGS. 5A-5C show a holder 500. The holder 500 is similar to the holder 400, except that the holder 500 includes the secure bar 300. The holder 500 includes a frame 502 and the secure bar 300. The frame 502 includes a first arm 504 and a second arm 506. The secure bar 300 can move, rotate, or translate freely and independently of the frame 502. The holder 500 includes a cavity 514 which is formed by the secure bar 300 and the frame 502, and which is sized and shaped to fit and accept a substrate (not shown). The first and second arms 504, 506 are joined at proximal ends. In one embodiment, the first arm 504 is longer than the second arm 506. In one embodiment, the second arm 506 is longer than the first arm 504. In one embodiment, the first and second arms 504, 506 are equal in length. In one embodiment, the frame 502 is a single piece. In one embodiment, the frame 502 is at least two pieces, such that the first arm 504 is part of or fully forms a first piece and the second arm 506 is part of or fully forms a second piece.

The secure bar 300 is proximal to the distal end of the first arm 504. In one embodiment, the first arm 504 is connected to the strut 304 of the secure bar 300. In one embodiment, the first arm 504 is connected to the bracket 302 of the secure bar 300. In one embodiment, the first arm 504 is connected to at least one bearing 208 of the secure bar 300.

In one embodiment, an inner surface of the first arm 504 includes a platform 510 at least partially located between the proximal and distal ends. The platform 510 can support the substrate (not shown).

The second arm 504 includes at least two securing blocks 100. In one embodiment, each of the securing blocks 100 of the second arm 506 are directly across the cavity 514 from the corresponding securing blocks 100 of the secure bar 300. In one embodiment, at least one of the securing blocks 100 is not directly across the cavity 514 from the corresponding securing block 100 of the secure bar 300. In one embodiment, the distal end of second arm 506 includes a pedestal 508 extending towards the secure bar 300. The pedestal 508 can support the substrate (not shown).

The secure bar 300 can also include a spring 512 to pre-load the secure bar 300 and/or at least one bearing 308 of the secure bar 300. In one embodiment, the spring 512 is connected to the first arm 504. In one embodiment, the spring 512 is connected to another element, such as a mount (not shown, see FIGS. 7A-7B). In one embodiment, the spring 512 is connected to the first arm 504 and the mount (not shown, see FIGS. 7A-7B).

In one embodiment, though the distal end 310 is adjustable, the other securing blocks 100 are stationary, excluding adjusting the height relative to the frame 502 or the secure bar 300.

In one embodiment, at least one of the first or second arms 504, 506 of the frame 502 includes at least one flexure (not shown), such as one or more flexible materials, a cut-out (e.g., a track, a groove, a notch, or the like), a material less stiff than the other material composing the frame, or the like. For example, the second arm can include the at least one flexure (not shown) to allow for movement of the securing block 100 via the proximal end or the distal end of the second arm 506 (depending on the location of the at least one flexure within the second arm 506, for example) to move along a given axis (for example, the z-axis) relative to the other end of the second arm 506. The at least one flexure (not shown) can extend at least partially through a top face of the second arm 506, can extend at least partially through a bottom face of the second arm 506, can extend at least partially through a side face of the second arm 506, or can extend entirely across the second arm 506. The segment including the at least one flexure (not shown) can also include a clasp (not shown) to set the position, angle, location, or the like along the given axis (for example, the z-axis) of the segment including the securing block 100 and the at least one flexure (not shown) once the desired position, angle, location, or the like has been determined. The clasp (not shown) can include, but is not limited to, screws, dowels, rods, and rivets. The clasp (not shown) can also be used to adjust position, angle, location, or the like of the segment including the at least one flexure (not shown). In one embodiment, the distal end of the second arm 506 can be adjusted (i.e., angle, position, location, or the like), such as by translating, flexing, bending, twisting, or moving, relative to, and/or independently of, the proximal end of the second arm 506. The distal end can also include at least one securing block 100. In one embodiment, the proximal end of the second arm 506 can be adjusted (i.e., angle, position, location, or the like), such as by translating, flexing, bending, twisting, or moving, relative to, and/or independently of, the distal end of the second arm 506. The proximal end can also include at least one securing block 100.

In one embodiment, all of the securing blocks 100 have the same configuration and design. In one embodiment, at least one of the securing blocks 100 has a configuration and/or design different than the other securing blocks 100.

FIGS. 6A-6D show a holder 600. In one embodiment, as shown in FIGS. 6A-6D, the holder 600 includes two holders 400, 500. In one embodiment, the holder 600 includes two holders, both of which are the holder 400. In one embodiment, the holder 600 includes two holders, both of which are the holder 500.

The holder 600 includes a motor 602 and a coupling 608. Though the motor 602 and the coupling 608 are shown in FIGS. 6A-6D for the holder 600, the motor 602 and the coupling 608 can be used in any embodiment of any holder discussed herein or any equivalent thereof.

In one embodiment, the holder 600 includes a slider 604 and a connector 606. The slider 604 is adjoined or connected to the secure bar 200. The connector 606 can be adjoined to a mount (not shown). A portion of the slider 604 can be fit within a track or groove of the connector 606, thereby permitting movement of the slider 604 along a single or given plane, such that the secure bar 200 can translate between the open and closed positions via the motor 602 and the coupling 608. Though the slider 604 and the connector 606 are shown in FIGS. 6A-6D for the holder 600, the slider 604 and the connector 606 can be used in any embodiment of any holder discussed herein or any equivalent thereof.

In one embodiment, a leaf spring (not shown) can be used in place of both the slider 604 and the connector 606.

Figure 7A:
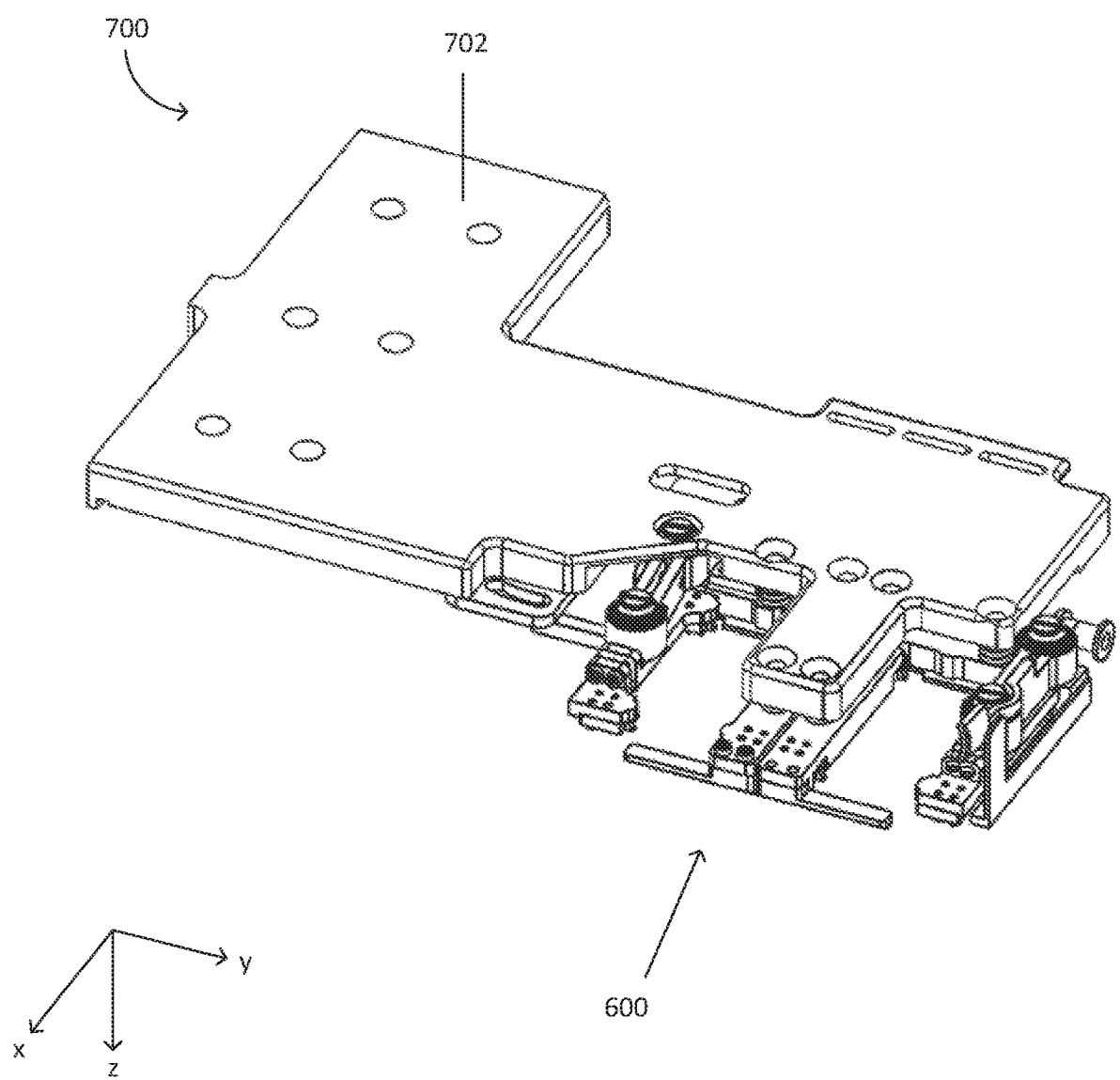
FIGS. 7A-7B show an example substrate holder attached to a mount.
Figure 7B:
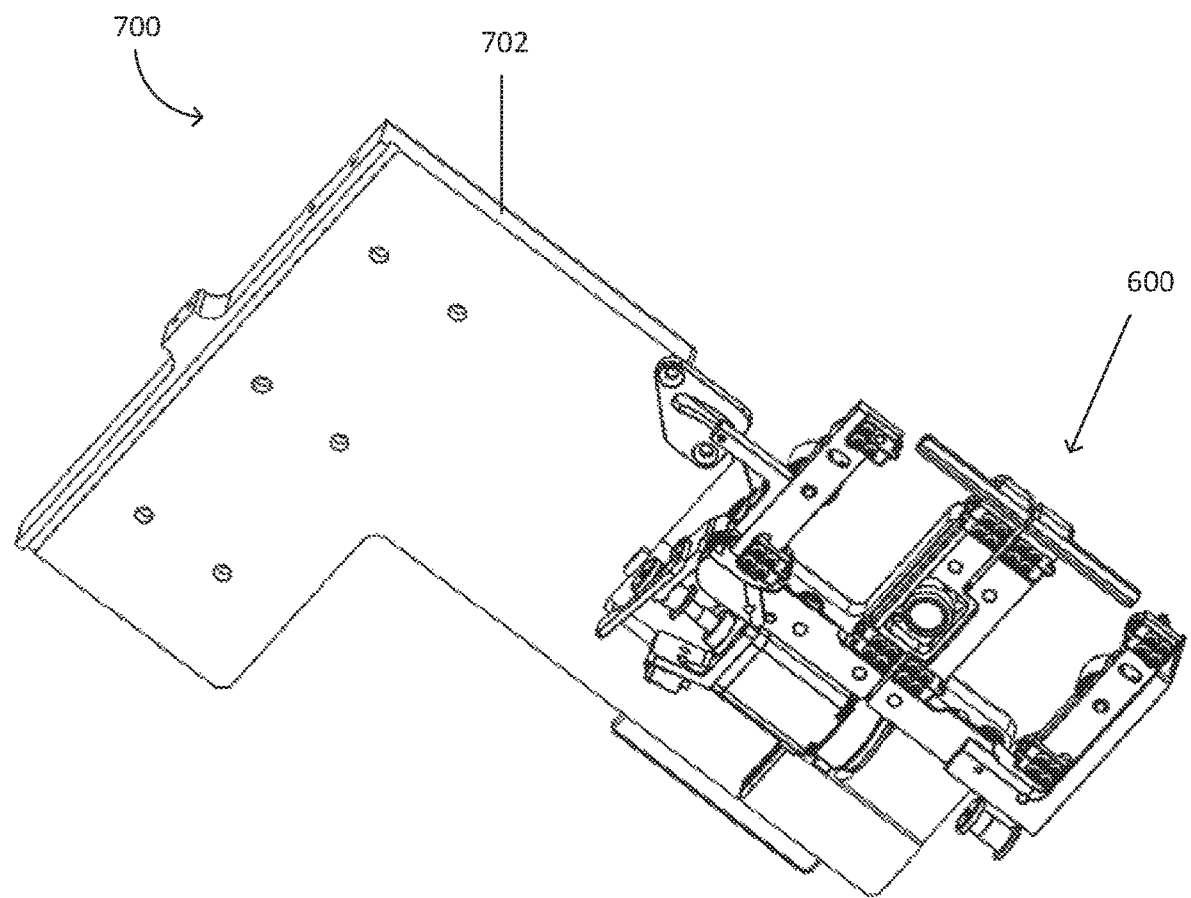

In one embodiment, the holder 600 can be attached to a secondary device 700, such as a scanner or an imaging microscope or a fluorescence microscope, for imaging and/or processing by a mount 702 (i.e. a screw, a nail, a peg, a pin, a nut and bolt, a dowel, a staple, a rivet, or the like), by an adhesive, by welding, by clips, by detents, by tongue and groove joint, or the like. The holder 600 and/or the mount 702 can include at least one hole to accommodate an attachment mechanism for proper, secure attachment to the secondary device. Though the mount 702 is shown in FIGS. 7A-7B for the holder 600, the mount 702 can be used in any embodiment of any holder discussed herein or any equivalent thereof. In one embodiment, the holder 600 can be attached to a secondary device for imaging and/or processing by the attachment mechanism (i.e. a screw, a nail, a peg, a pin, a nut and bolt, a dowel, a staple, a rivet, or the like), by an adhesive, by welding, by clips, by detents, by tongue and groove joint, or the like. The holder 600 can include at least one hole to accommodate the attachment mechanism for proper, secure attachment to the secondary device. Though the attachment mechanism is discussed for the holder 600, the attachment mechanism can be used in any embodiment of any holder discussed herein or any equivalent thereof.

In one embodiment, the mount 702 can be adjusted, such as by the attachment mechanisms, to be planar (i.e., parallel to or coplanar with) with an imaging plane (for example, a x-y plane).

Method

For the sake of convenience, the methods are described with reference to a slide as an example substrate and with the holder 400. But the methods described below are not intended to be so limited in their scope of application. The methods, in practice, may be used with any kind of substrate (for example, without limitation, a well plate) and with any embodiment of holder, secure bar, or securing block.

In one embodiment, a reference slide is inserted into the holder 400. The reference slide can be placed onto the platform 410 and the pedestal 408 or can be placed in direct contact at least two of the securing blocks 100. The secure bar 200 is in the open position. The secure bar 200 is moved into the closed position. The ramps 106 of the respective securing blocks 100 lift the reference slide up and the stoppers 104 of the respective securing blocks 100 set the maximum lift distance for the reference slide and constrain the reference slide. When the secure bar 200 is set in the closed position, the force exerted on the reference slide by the securing blocks 100 inhibits translational movement of the reference slide relative to the holder 400. The securing block 100 at the distal end 212 of the secure bar 200 can be adjusted to account for any warpage or deformations in the reference slide, thereby making the reference slide planar or substantially planar with an imaging plane (for example, the x-y plane). Once the reference slide is secured, such that the planarity of the reference slide is confirmed or observed in any appropriate manner, the secure bar is moved into the open position to release the forces on the slide. The ramps of the respective securing blocks guide the slide down. The reference slide is then removed from the holder and an experimental slide (i.e., a slide include a sample to be imaged) is inserted to restart the process.

In one embodiment, the method discussed above excludes a reference slide and is done on a slide-by-slide basis (i.e., inserted, secure bar closed, securing block adjusted, etc.). In one embodiment, the method discussed above excludes a reference slide and is done for the first experimental slide with the adjustment to the securing block 100 being retained for all subsequent experimental slides.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention. Additionally, though "first" and "second" are used, the terms are not intended to limit various features/elements to only one or two. Rather, three (i.e., third), four (i.e., fourth), or more may be included or used where appropriate or desirous to do so.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

What is claimed is:

1. A device for holding a substrate, comprising:
a frame comprising a first arm and a second arm, wherein the second arm comprises at least two securing blocks,
a secure bar comprising at least two securing blocks, and
a flexure positioned between the at least two securing blocks of the second arm or positioned between the at least two securing blocks of the secure bar,
wherein the at least two securing blocks of the second arm and the at least two securing blocks of the secure bar are on opposing sides of a cavity and are configured to directly contact and hold the substrate,
wherein the cavity is formed by the secure bar and the frame, and
wherein (1) the flexure is configured to adjust one securing block of the secure bar relative to the secure bar, or (2) the flexure is configured to adjust one securing block of the second arm relative to the second arm.

2. The device of claim 1, wherein the flexure is at least one of a cut-out, a track, a groove, a notch, or one or more flexible materials.

3. The device of claim 1, wherein the flexure is configured to adjust at least one of a position, angle, or location of one securing block of the secure bar or one securing block of the second arm.

4. The device of claim 1, wherein each of the securing blocks comprise a stopper and a ramp.

5. The device of claim 1, wherein the secure bar is moveable relative to the frame.

6. The device of claim 5, wherein the secure bar is connected to the first arm of the frame with at least one bearing, the bearing configured to permit the secure bar to move relative to the frame.

7. The device of claim 5, further comprising a motor to move the secure bar relative to the frame.

8. The device of claim 1, further comprising a mount, wherein the mount connects the device to a secondary device.

9. The device of claim 8, wherein the secondary device is a scanner, an imaging microscope, or a fluorescence microscope.

10. The device of claim 8, further comprising a slider adjoined to the secure bar and a connector adjoined to the mount, wherein a portion of the slider fits within a track of the connector.

11. The device of claim 1, the first arm further comprising a platform configured to support the substrate.

12. The device of claim 1, the second arm further comprising a pedestal configured to support the substrate.

13. A device for holding a substrate, comprising:
- a frame comprising a first arm and a second arm, wherein the second arm comprises at least two securing blocks;
- a secure bar comprising at least two securing blocks; and
- a flexure positioned between the at least two securing blocks of the second arm or between the at least two securing blocks of the secure bar,
- wherein the secure bar is movable relative to the frame,
- wherein the at least two securing blocks of the second arm and the at least two securing blocks of the secure bar are on opposing sides of a cavity and are configured to directly contact and hold the substrate, and
- wherein the cavity is formed by the secure bar and the frame.

14. The device of claim 13, wherein the flexure is positioned between the at least two securing blocks of the secure bar.

15. The device of claim 13, wherein the flexure is configured to adjust at least one of a position, angle, or location of at least one of the at least two securing blocks of the secure bar or at least one of the at least two securing blocks of the second arm.

16. The device of claim 15, wherein the flexure is configured to adjust at least one of the position, angle, or location of one of the at least two securing blocks of the secure bar.

17. The device of claim 15, wherein the flexure is configured to adjust at least one of the position, angle, or location of one of the at least two securing blocks of the secure bar independently of the other one of the at least two securing blocks of the secure bar and independently of the at least two securing blocks of the second arm.

18. The device of claim 13, wherein the flexure comprises a clasp.

19. The device of claim 13, wherein the flexure is at least one of one or more flexible materials, a cut-out, a track, a groove, or a notch.

20. The device of claim 13, wherein the secure bar is movable to an open position to permit the insertion of the substrate, and movable to a closed position to permit the holding of the substrate.

* * * * *